April 30, 1935.  T. M. PATTERSON  1,999,847

LAWN MOWER SHARPENER

Filed Dec. 23, 1932

INVENTOR
THOMAS M. PATTERSON
BY
Brockett, Hyde, Higley & Meyer
ATTORNEYS

Patented Apr. 30, 1935

1,999,847

UNITED STATES PATENT OFFICE 1,999,847

LAWN MOWER SHARPENER

Thomas M. Patterson, Lakewood, Ohio

Application December 23, 1932, Serial No. 648,636

3 Claims. (Cl. 76—82.1)

My invention relates to a lawn mower sharpener. More specifically, my invention relates to a device for removing stock from and thereby sharpening the usually spirally shaped movable blades of a lawn mower which cooperate with a fixed blade or cutter bar forming a part of the mower to provide a shearing action.

The objects of my invention are to provide a simple and inexpensive device that is applicable to or removable from a lawn mower for sharpening the movable cutting blades thereof without necessitating any change or removal of the parts of the mower and without the addition and positive attachment of any supplemental parts thereto; to provide a device embodying means for cooperating with a fixed part of the mower, in this instance the stationary cutter blade, and guide the device in fixed position relative to such stationary part whereby the sharpening element of the device will engage each part along the edge of each spirally shaped movable cutter blade being sharpened, with such engaged part of the blade in a predetermined position relative to the stationary cutter bar; to provide a device embodying means for moving the spirally shaped movable blades of a mower progressively along their length into such predetermined position relative to the stationary cutting blade substantially simultaneously with the sharpening action of the device; to provide a device having features of adjustability which will permit the device to be applied to mowers wherein the stationary cutter bars are of different width and to provide a means for predetermining the amount of stock to be removed from each moving blade during the sharpening operation whereby all of the blades will have the same cutting or shearing coaction with the stationary cutter bar after a sharpening operation has been completed; and to provide a device that may be used by inexperienced operators and by the use of manual power alone.

Figure 1:
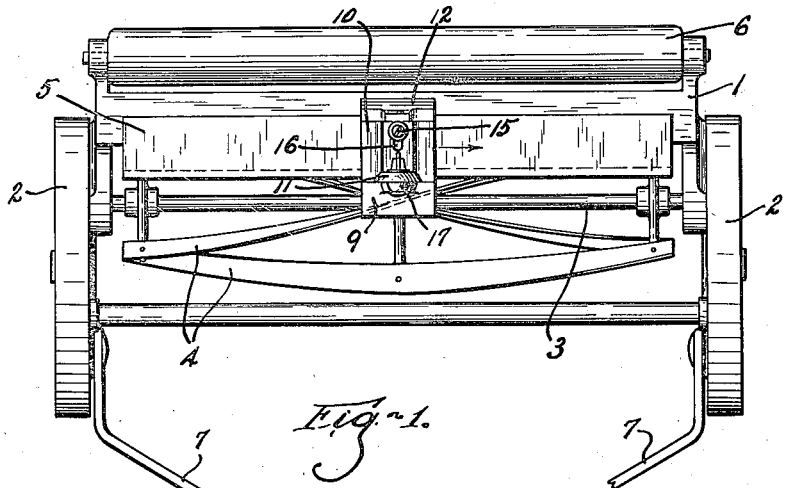
Figure 2:
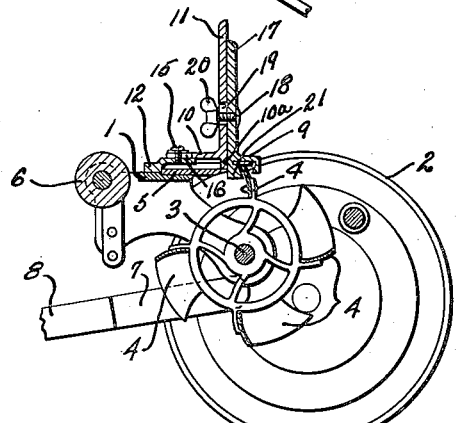
Figure 3:
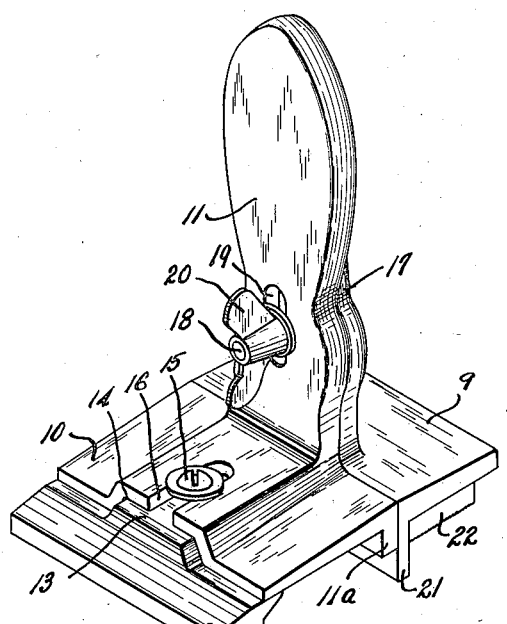
Figure 4:
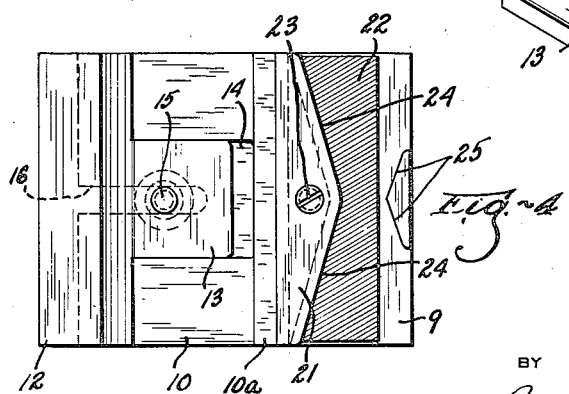

Various other objects and advantageous features of my invention will be seen in the following description and one embodiment thereof may be seen in the accompanying drawing wherein similar characters of reference designate corresponding parts, and wherein:

Fig. 1 is a view showing an ordinary type of lawn mower in inverted position and with the sharpening device forming the subject matter of this invention applied to the stationary cutter bar thereof and in sharpening position relative to the spirally shaped moving cutting blades; Fig. 2 is a sectional view of the sharpening device and mower shown in Fig. 1; Fig. 3 is a perspective view of a moving cutting blade sharpening device constructed in accordance with my invention; and Fig. 4 is a bottom plan view of the sharpening device shown in Fig. 3.

In Figs. 1 and 2 of the drawing, I have shown an ordinary type of lawn mower consisting of a frame 1 supported on wheels or traction elements 2 which, through suitable gearing not shown, are adapted to rotatably drive a shaft 3 carrying spirally shaped cutting blades 4 thereon which, when the shaft 3 is rotated, move and cooperate with a cutter blade or bed knife, which is part of a cutter bar 5 fixed on the frame 1, successively throughout their lengths to provide a shearing action on grass or the like above which the mower travels. As is usual, a rotatable roller element 6 is carried by the frame 1 to the rear of the stationary cutter bar 5, and handle connecting members 7 are fixed to the frame 1 to be attached to a handle 8 that serves to provide a means for pushing the mower over a lawn.

As shown in the drawing, my sharpening device is a self-contained tool which is made up of two parts 9 and 10, the part 10 including a handle member 11 and being arranged to loosely slidably rest on and interfit with what is the upper side of the stationary cutter bar 5 of the mower when such mower is in inverted position (see Figs. 1 and 2). Such member 10 comprises spaced heel and toe abutment portions, namely, a front depending edge or toe portion 11a adapted to rest on the stationary bed knife of cutter bar 5 adjacent the forward edge thereof as shown in Fig. 2 and a rearward edge member or heel portion 12 that fits over the rearward edge of the cutter bar 5 or an equivalent frame portion parallel to the knife blade and is adjustable relative to the main body portion of the member 10 by being connected therewith by a tongue and groove connection including a tongue 13 and a groove 14. Thus the member 10 may be adapted to stationary frame members or cutter bars of different widths, the movable rear edge member 12 being held in its adjusted position by a screw bolt 15 bearing against the top of the member 10, extending through a slot 16 therein and into the tongue 13 of the movable rear edge member 12. With this construction, it will be seen that the member 10 of the sharpening device may be disposed on stationary frame members or cutter bars of any width with the movable rearward edge member 12 hooked over the rearward edge of the cutter bar 5 and the front edge member 11a in position adapted to rest on the forward edge of the bed knife.

The member 9 of the sharpening device is angled slightly downwardly from the member 10 and includes an integral upward extension 17 that bears against the handle 11 of the member 10 and is adjustable upwardly and downwardly relative thereto by being connected therewith through a bolt 18 which extends through the extension 17 and through a slot 19 in the handle 11, the bolt having a wing nut 20 thereon by means of which the members 11 and 11 may be tightly drawn and held together after adjustment relative to each other. The lower or main body portion of the member 9 has a depending rearward edge 21 adapted to abut against the forward edge of the bed knife on the stationary cutter bar 5 when the sharpening device is assembled therewith as shown in Fig. 2, whereby the sharpening device after being placed thereon loosely is firmly guided in its slidable movement along the length of the cutter bar while being held against movement in either direction transversely of the cutter bar.

A sharpening member 22 such as a file or the like is removably held on the under surface of the member 9 by means of a screw or the like 23 and in such position that it will engage the cutting edge of one of the movable blades 4 when such movable blade is in a certain predetermined position relative to the stationary cutter bar, and in such manner that sliding movement of the sharpening device along the stationary cutter bar 5 will cause a sharpening action on the cutting edge of the blade 4 to thereby sharpen it, the arrangement of parts hereinbefore described being such that the sharpening member will be held in the same alignment with the stationary cutter bar throughout the sliding movement.

Means have been provided on the main body portion of the member 9 for moving points along the spirally shaped blades 4 with which the sharpening member 22 is in contact into the same predetermined position relative to the stationary cutter bar 5 progressively with sliding movement of the sharpener along the length of the stationary cutter bar, it being understood that the movable blades 4 are usually spirally shaped as shown in Fig. 1 and contact with the stationary cutter bar at any one time only at a point within their length during movement of the blades to provide a shearing action. This means for bringing all points of the blade throughout its length successively into a predetermined position relative to the stationary cutter bar 5 consists of an angular guide face 24 disposed directly beneath the sharpening element 22 and arranged to extend at such an angle that it will truly cooperate with the surfaces of the spirally shaped movable cutter blades 4 and act as a wedge between the blades and the cutter bar to progressively move the cutting edges of the movable cutter blades into a given position relative to the stationary cutter bar 5 as the sharpener is slid along the cutter bar 5 from one end thereof to the other. It will be noted that two such angular guide faces 24 are provided, the guide faces extending in opposite directions from the ends to the center of the member 9, to adapt the sharpener to mowers wherein the movable cutter blades 4 are spiralled to the right or to the left relative to the stationary cutter bar.

Means are also provided for oppositely moving the movable blades 4, when the sharpener is returned to its original starting position along the stationary cutter bar 5, to their original starting position. This means consists of angular guide faces 25, one for each angular guide face 24, the respective faces 25 extending in parallelism with the respective faces 24 and being spaced therefrom as shown in Fig. 4 to provide for the cutting edge of the movable cutter blades 4 extending therebetween and into contact with the sharpening element 22. Thus, a means is provided for progressively moving points along the length of the cutter blades 4 into predetermined position relative to the stationary cutter bar 5 both when the sharpener is slid forwardly and backwardly along the length of the stationary cutter bar. As hereinbefore stated, the member 9 is angled slightly downwardly from the member 10, the member being so arranged to provide for an angular cutting of the edges of the movable cutter blades 4 and thereby provide clearance on the cutting edge of the blades for cooperation with the stationary cutter bar.

In the use and operation of this device, several methods of operation may be used depending upon the type and construction of the mower whose movable blades are to be sharpened. For example, in some mowers there is sufficient play in the driving mechanism for the movable blades to permit the blade carrying shaft to idly rotate in both directions far enough to present one end of a spirally shaped blade in a predetermined sharpening position relative to the stationary cutter bar 5 by forward and then backward movement of the sharpener along the bar 5. With this type of lawn mower, the mower is first inverted as shown in Figs. 1 and 2 and the device is then loosely placed on the stationary cutter bar 5 with the rearward adjustable edge portion thereof hooked over the rearward edge of the stationary cutter bar and the forward depending edge 11a thereof above the cutter bar adjacent the forward or cutting edge thereof. At this time, the sharpening element 22 will rest on the cutting edge of one of the blades 4 and the device is then adjusted by loosening the wing nut 20 and moving the forward depending edge or toe portion of the member 10 toward or away from the bar 5 a distance corresponding to the amount of stock to be removed from the cutting edge of the blade 4. Then, the wing nut 20 is tightened to hold the members 9 and 10 securely together, with the depending edge 11a of the member 10 spaced above the stationary bed knife of cutter bar 5 and the sharpening element 22 resting on the cutting edge of the blade 4, and the device is manually moved along the length of the cutter bar 5 which will act on the cutting edge of the blade 4 to remove stock therefrom and sharpen the same. In the event a file is used as the sharpening element 22, the device must be drawn back to its original position along the stationary cutter bar 5 without any sharpening action taking place and, in the event that there is sufficient play in the operating mechanism for the movable cutter blades 4, the device may be manually reciprocated along the length of the stationary cutter bar to sharpen the cutting toe portion of one blade 4 until the depending edge 11a of the member 10 contacts with the stationary bed knife of cutter bar 5 at which time the desired amount of stock will have been removed from the blade 4 and the blade sharpening completed whereupon the device is lifted from the mower and the next blade 4 to be sharpened brought into registry with the stationary cutter bar 5 whereupon the sharpening action just described is repeated.

Other types of mowers lack sufficient play in the driving mechanism thereof to permit reciprocatory movement of the sharpening device while still in cooperation with the same blade 4. With such type of mower, two methods of operation are available to the operator. One of these operations consists in placing the sharpening device on the mower in conjunction with one end of a blade 4 and then pushing the device across the stationary cutter bar in such direction as to move the blade 4 being operated on in the same direction in which it moves when the blades are idling. Then, after this operation has been completed the sharpener is lifted off and replaced on the opposite end of the stationary cutter bar 5 in cooperation with the end of the next succeeding blade 4, this changing operation being repeated until all of the blades have been acted on and sufficiently sharpened. The second method of action with this type of mower consists in disconnecting the driving mechanism for the blades 4 and then sharpening one blade at a time as hereinbefore described when the sharpener is used on mowers wherein the cutter blades 4 may be turned sufficiently in either direction by movement of the sharpener forwardly and backwardly along the length of the stationary cutter bar 5 to progressively present each point throughout the length of the blade in a predetermined position relative to the stationary cutter bar.

What I claim is:

1. A sharpening device for the movable cutting blades of a lawn mower or the like, comprising a device arranged for guiding cooperation with a stationary part of the mower, a sharpening member carried by said device to engage the cutting edge of a movable blade and arranged to act as a sharpener for the engaged blade by movement of said device along said stationary part, means on said device for actuating said movable blade during movement of said sharpening device along said stationary part, whereby to bring each point along the blade length into predetermined relation with said stationary part for action thereon by said sharpening member, means for adjusting said sharpening member to remove varying amounts of blade stock in the sharpening operation, there being means on said device for positively limiting the sharpening action to the removal of a predetermined amount of blade stock.

2. A self-contained, loosely applied sharpener for the movable blades of a lawn mower having a relatively stationary flat frame member with a cutting edge and a series of movable spiral cutting blades, comprising a body member having spaced heel and toe abutment portions adapted to rest upon and travel along the flat face of the frame member, the toe portion adjacent the cutting edge of the frame member and the heel portion along a line parallel to but back of the cutting edge, and a tool carrying part mounted on the body portion for adjustment in a direction normal to the face of the frame member and carrying a sharpening member, said tool carrying part also having a straight portion adapted to travel along the edge of the frame member and an inclined part adapted to travel along the edge of the spiral blades for operating the latter, the said adjustment determining the depth of cut already produced when both abutment portions actually ride upon the frame member.

3. A sharpening tool for the movable cutting blades of a lawn mower or the like having a stationary blade and a plurality of movable cutting blades, comprising a device arranged for guided movement longitudinally of said stationary blade, a sharpening member carried by said device to engage the cutting edge of a movable blade and arranged to act as a sharpener for the engaged blade by movement of said device longitudinally of said stationary blade, a member on said device opposite said sharpening member engaging a stationary portion of the mower and traveling thereon along a line substantially parallel to the cutting edge of said stationary blade, said device having a stop portion intermediate said members adapted to engage and travel near the edge of the stationary mower portion, one of said members and said stop portion being relatively adjustable in a direction normal to the cutting face of said sharpening member to vary the relation between said stop portion and stationary mower portion, whereby said sharpening member supports said device during the sharpening action until said stop portion engages the stationary mower portion to limit further cut.

THOMAS M. PATTERSON.

CERTIFICATE OF CORRECTION.

Patent No. 1,999,847.

April 30, 1935.

THOMAS M. PATTERSON.

It is hereby certified that error appears in the printed specification of the above numbered patent requiring correction as follows: Page 2, second column, line 68, for "toe portion" read edge; and line 69, for "edge" read toe portion; and that the said Letters Patent should be read with these corrections therein that the same may conform to the record of the case in the Patent Office.

Signed and sealed this 25th day of June, A. D. 1935.

Bryan M. Battey

Acting Commissioner of Patents.

(Seal)